(No Model.)

E. A. LEHMANN.
SUSPENSION HOOK FOR EAR RINGS, &c.

No. 300,488. Patented June 17, 1884.

WITNESSES:
Jos. N. Rosenbaum
Martin Petry

INVENTOR
Emil A. Lehmann
BY Goepel & Raegener
ATTORNEYS

UNITED STATES PATENT OFFICE.

EMIL A. LEHMANN, OF NEW YORK, N. Y.

SUSPENSION-HOOK FOR EAR-RINGS, &c.

SPECIFICATION forming part of Letters Patent No. 300,488, dated June 17, 1884.

Application filed March 12, 1884. (No model.)

*To all whom it may concern:*

Be it known that I, EMIL A. LEHMANN, of the city, county, and State of New York, have invented certain new and useful Improvements in Suspension-Hooks for Ear-Rings, of which the following is a specification.

This invention has reference to an improved suspension-hook for ear-rings and other jewelry, whereby said articles are conveniently applied for use and are securely held in position; and the invention consists of a suspension-hook for ear-rings made of a longer hook-shaped part and of a shorter part hinged to the lower end of the hook, and provided with a cup-shaped socket having an exterior projection for releasing the shorter part from the end of the hook.

Figure 1:
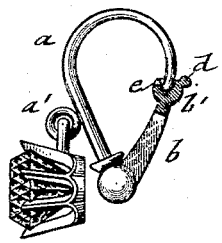
Figure 4:
Figure 5:
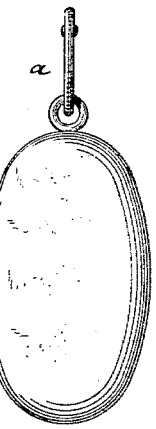
Figure 2:
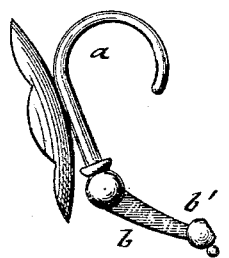
Figure 3:
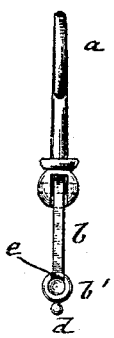

In the accompanying drawings, Figure 1 represents a side elevation, partly in section, of my improved suspension-hook for ear-rings, &c. Fig. 2 shows a side view of the same in open position. Fig. 3 is an end view of Fig. 2, and Figs. 4 and 5 are an end view and a side view of my improved suspension-ring as applied to a locket.

Similar letters of reference indicate the same parts throughout the several views.

In the drawings, *a* represents the suspension-hook of an ear-ring, locket, or other article of jewelry. When used for an ear-ring, the hook *a* is passed through the hole in the lobe of the ear. An eye, *a'*, at the front part of the hook *a* serves for attaching the ornamental setting of the ear-ring. When the hook is used for lockets, the eye is dispensed with and the locket applied directly to the hook, as shown in Figs. 4 and 5. To the lower end of the hook *a* is hinged a shorter part or link, *b*, which is provided at the upper end with a cup-shaped socket, *b'*, having a recess, *e*, at the side facing the hook *a*. As the hook *a* decreases in thickness toward its upper end, it has a certain degree of elasticity, whereby it is enabled to spring into the cup-shaped socket when it is desired to close the hook or to be released therefrom when it is to be opened. A small projection, *d*, of the socket *b'* serves as a rest for the finger-nail, so as to open the hook by withdrawing the part *b* from the closing end of the hook.

The simple construction of the hook and the easy and convenient operation of the same facilitates the use of ear-rings and other articles of jewelry and retains them securely in position for use.

Having thus described my invention, I claim as new and desire to secure by Letters Patent—

The combination of a spring suspension-hook, *a*, with a shorter part, *b*, hinged to the lower end of the spring-hook, and provided with a cup-shaped socket, *b'*, at the upper end, said socket having a recess, *e*, at that side facing the spring-hook, and a projection, *d*, integral with the socket, for releasing the closing part *b* from the spring-hook, as herein shown and described, substantially as set forth.

In testimony that I claim the foregoing as my invention I have signed my name in presence of two subscribing witnesses.

EMIL A. LEHMANN.

Witnesses:
PAUL GOEPEL,
OTTO RISCH.